106-18.16
9/29/87  XR  4,696,864  SR

United States Patent [19]
Ward et al.

[11] Patent Number: 4,696,864
[45] Date of Patent: Sep. 29, 1987

[54] METHOD OF PROVIDING STRUCTURAL SUPPORT FOR COMPOSITIONS

[75] Inventors: Thomas A. Ward, Gibsonia; Victor G. Petracca, Apollo; Timothy Figore, Springdale, all of Pa.

[73] Assignee: PPG Industries, Inc., Pittsburgh, Pa.

[21] Appl. No.: 759,215

[22] Filed: Jul. 26, 1985

[51] Int. Cl.$^4$ .......................... C09J 5/02; B32B 27/38; B32B 15/08
[52] U.S. Cl. ..................................... 428/413; 52/232; 106/18.13; 106/18.16; 106/18.27; 156/307.3; 156/330; 428/418; 428/921
[58] Field of Search ..................... 428/313.9, 408, 457, 428/920, 921, 413, 418; 52/232, 249, 269, 378, 454; 110/331, 336; 106/18.13, 18.16, 18.27

[56] References Cited
U.S. PATENT DOCUMENTS

| | | | |
|---|---|---|---|
| 3,590,540 | 7/1971 | Johnson et al. | 52/269 X |
| 4,069,075 | 1/1978 | Billing et al. | 156/82 |
| 4,529,467 | 7/1985 | Ward et al. | 428/920 X |

*Primary Examiner*—Michael R. Lusignan
*Attorney, Agent, or Firm*—Linda Pingitore

[57] ABSTRACT

A method of providing a structural support for a composition on a substrate involves:
I. anchoring to the surface of a substrate a multiplicity of fire resistant members, said members protruding from the surface of the substrate;
II. applying a self-adhering composition to the surface of the substrate so as to at least partially encapsulate the protruding fire resistant members.

18 Claims, No Drawings

METHOD OF PROVIDING STRUCTURAL SUPPORT FOR COMPOSITIONS

BACKGROUND OF THE INVENTION

The present invention relates to methods of providing structural support for compositions.

Frequently compositions require structural support to adhere them to a substrate. Even compositions which are self-adhering may nevertheless require some structural support on certain substrates such as bulkheads, walls, ceilings and other expansive, flat surfaces. This structural support is helpful to maintain the adhesion of the composition to the substrate in the face of ordinary servicelife conditions of expansion, contraction and flexing of the substrate due to, for example, weight loads and heating and cooling cycles; and also in the face of other exterior conditions such as high winds and severe climatic conditions. This structural support can be particularly helpful under conditions of fire or intense heat in which the composition's ability to remain intact and remain adhered to the substrate is challenged. This is especially true of compositions which form a char under conditions of fire or intense heat, for example, intumescent compositions. In this type of composition the char may be particularly vulnerable to cracking and releasing from the substrate on large, flat substrates such as bulkheads. Conventional means of structural support such as reticulated reinforcement may be in excess of the amount of support required for some self-adhering compositions, thus the added labor and materials expense is difficult to justify.

There is a need, therefore, for alternate means of providing structural support for many compositions.

SUMMARY OF THE INVENTION

In accordance with the present invention there is provided a method of providing a structural support for a composition on a substrate, comprising:
I. anchoring to the surface of a substrate a multiplicity of fire resistant members, said members protruding from the surface of the substrate;
II. applying a self-adhering composition to the surface of the substrate so as to at least partially encapsulate the protruding fire resistant members.

DETAILED DESCRIPTION OF THE INVENTION

The present invention furnishes a method of providing a structural support for a composition on a substrate.

In the initial step of this method a multiplicity of fire resistant members are anchored to the surface of a substrate so that they protrude from the surface of the substrate. By multiplicity is meant at least two fire resistant members and preferably several. The actual number of fire resistant members which are utilized is not critical and can vary widely depending upon the size of the substrate, the amount of reinforcement or support which is desired, and the actual composition and the degree to which it can adhere to a substrate without support. The fire resistant members can be arranged on the substrate in a variety of patterns. The amount of space between members will, of course, depend on the particular substrate, the actual number of members desired and the configuration of the members on the substrate.

The fire resistant members of the present invention are non-reticulated structures. That is, they are not in the form of a web or network such as metal lath, wire mesh or screen. By fire resistant is meant that the member will not be ignited and destroyed by fire conditions. Moreover, the member will not lose its structural integrity before the required protection time of the coated substrate is reached. For example, the fire resistant members can be constructed of a variety of materials including metals such as steel, aluminum, or various metal alloys; inorganic materials such as ceramic; and carbon. Moreover, the fire resistant members can be used in any number of forms, for example, metal strips, brackets, rods, rivets, screws, bolts, nails, metal wire and combinations of these if desired.

The fire resistant members can be anchored to the substrate in a variety of ways. For example, the member can be spot or stud welded to the surface. This is particularly useful when the member is a metal strip, wire, nail, or bracket. The member can also be anchored to the substrate with threaded means. For example, a hole can be introduced into the substrate and tapped allowing a threaded member to be attached. In another embodiment a hole can be introduced into the substrate and a threaded member maintained in position with threaded nuts on one or both sides of the substrate. The member can also be riveted to the surface or adhered to the surface using an adhesive composition adapted for such a purpose.

An important aspect of this invention is that the fire resistant members be anchored to the substrate so they protrude from the surface. By this is meant that each member prominently projects outward from the surrounding substrate surface.

The substrate to which the fire resistant members are anchored can be constructed of a variety of materials and formed in varying shapes. Moreover, the substrate can be a structural member or a partition. The claimed invention has particular application and advantage wherein the substrate is a ceiling, wall, or floor for construction on land. When the ceiling, wall, floor or other partition is to be used on a ship or, for example, an off-shore oil drilling platform, it is often referred to as a bulkhead. The claimed invention also has advantageous application to substrates of other geometric shapes such as cyclindrical or spherical shapes, for example, fuel storage tanks.

In the other step of the claimed method a composition is applied to the surface of the substrate so as to at least partially encapsulate the protruding fire resistant members. The composition can be an air dry composition or preferably, a curable composition. In further preferred embodiments the composition is self-adhering and char-forming. By self-adhering is meant that the composition is capable of adhering to the substrate without the assistance of a structural support. Also, for char forming compositions it means that the char residue which is formed after the composition is subjected to fire conditions is also capable of adhering to the substrate.

Char forming means that the composition after it is subjected to high temperatures or flames forms a hard, thick material which serves to insulate and protect the underlying substrate. In a more preferred embodiment the char forming composition is an intumescent composition; that is, it foams and swells when exposed to high temperatures or flames. As a result of this expansion, the char which is formed is a thick multi-celled material.

In one embodiment the composition as applied and dried or cured is thermally insulating. By thermally insulating is meant that the composition is capable of protecting the substrate from heat or fire conditions either as applied and dried or cured; or if the composition is char forming, the char that is formed upon exposure of the composition to heat or fire conditions is capable of protecting the substrate from these conditions.

One can utilize a variety of compositions in the method of the claimed invention. Preferably a self-adhering, char forming, intumescent, curable composition is utilized comprising:
(a) an epoxy resin;
(b) a curing agent adapted to cure said epoxy resin; and
(c) an additive component comprising a mixture of materials adapted to provide a source of
  (1) phosphorus,
  (2) zinc,
  (3) boron, and
  (4) an expansion gas upon thermal decomposition.

This composition is described in detail in U.S. patent application Ser. No. 545,286, filed Oct. 25, 1983, which has been allowed, and has issued as U.S. Pat. No. 4,529,467 to Ward et al and is incorporated by reference herein. Other examples of compositions include a variety of intumescent compositions as well as inorganic compositions including cementitious compositions.

It should be understood that self-adhering compositions which are utilized in the claimed method are capable of adhering to the surface of the substrate and remaining on the surface without the support of the fire resistant members. However, when exposed to challenges such as expansion, contraction and flexing due to vibrations or weight loads, severe climatic conditions such as high winds, heating and cooling cycles, or to intense heat or fire conditions, particularly if the composition is char forming and results in formation of a char upon exposure to these conditions, the adhesion of the coating or char is decreased and may not be capable of remaining intact and adhered to the substrate. The fire resistant members, in these circumstances, act as mechanical supports which supplement the composition's existing adhering ability. The supports help to anchor the coating or char to the substrate and maintain its integrity in the face of the challenges of everyday servicelife and particularly conditions of intense heat or fire.

The following example is intended to be illustrative of the invention and is not meant to limit the invention to its details.

EXAMPLE I

This example illustrates the method of the claimed invention. The thermally insulating composition utilized was an intumescent curable composition and the substrate was a steel bulkhead plate.

The bulkhead steel plate used as the test substrate measured 1 meter$^2$ ×5 millimeters. A total of nine protruding fire resistant steel tabs (6 millimeter ×76 millimeter steel strips) were anchored onto the surface of the bulkhead plate by spot welding. The tabs were spaced one square foot apart. An intumescent self-adhering curable composition, commercially available from PPG Industries, Inc., as PITT-CHAR ® fire protective coating, was applied to the bulkhead plate at a thickness of 19 millimeters. The bulkhead plate was allowed to cure for about 7 days at room temperature and then burned in a gas fired furnace according to BS 1476: part 8: 1972.

The furnace utilized measured 0.914 meters ×0.914 meters ×0.914 meters. The outside construction was steel and the furnace was lined with a ceramic refractory insulation. A single burner was centered vertically in the wall opposite the bulkhead plate. The burner, of non-impinging flame design, was rated for 1.5 million BTU/hour. Furnace conditions were monitored by four inconel-sheathed chromel-alumel thermocouples positioned six inches from the face of the bulkhead plate. The exterior surface temperature of the bulkhead plate was monitored by six chromel-alumel thermocouples posit coating. The thermal insulation was indicated by the time in minutes from the start of the test until failure occurred under the insulation criteria of the test or if no failure occurred, until the test was terminated. For the insulation criteria failure was deemed to occur when the average temperature (average of all thermocouples) increased by more than 140° C. above the initial ambient temperature, or the temperature of any single thermocouple increased by more than 180° C. above the initial ambient temperature.

The control for this test was a bulkhead steel plate which was identical to the test plate except that no fire resistant protruding members were anchored to the surface. The intumescent composition was simply applied to the bulkhead plate and cured and the test carried on as described above.

The control bulkhead plate failed after 36 minutes burn time; also a large crack was observed in the char after the test was terminated following two hours of burn time.

The test plate with the welded metal strip reinforcements failed after 46 minutes burn time. The char was not cracked.

What is claimed is:
1. A method of providing a structural support for a composition on a substrate, comprising:
  I. anchoring to the surface of a substrate a multiplicity of fire resistant members, said members protruding from the surface of the substrate;
  II. applying a self-adhering composition to the surface of the substrate so as to at least partially encapsulate the protruding fire resistant members.
2. The method of claim 1 wherein the composition is a curable composition.
3. The method of claim 1 wherein the composition is thermally insulating.
4. The method of claim 1 wherein the fire resistant members are non-reticulated structures.
5. The method of claim 4 wherein each fire resistant member is a metal strip.
6. The method of claim 1 wherein the substrate is a metal.
7. The method of claim 1 wherein the substrate is a bulkhead or a wall.
8. A method of providing a structural support for the insulating char residue derived from a char forming a self-adhering composition on a substrate, comprising:
  I. anchoring to the surface of a substrate a multiplicity of fire resistant members, said members protruding from the surface of the substrate;
  II. applying said char forming self-adhering composition to the surface of the substrate so as to at least partially encapsulate the protruding fire resistant members.

9. The method of claim 8 wherein the char forming composition is a curable composition.

10. The method of claim 8 wherein the char forming composition is an intumescent composition.

11. The method of claim 8 wherein the fire resistant members are non-reticulated structures.

12. The method of claim 8 wherein the substrate is a metal.

13. The method of claim 8 wherein the substrate is a bulkhead or a wall.

14. The method of claim 8 wherein each of the fire resistant members is a metal strip.

15. The method of claim 8 wherein the char forming composition is an intumescent curable composition comprising:
 (a) an epoxy resin;
 (b) a curing agent adapted to cure said epoxy resin; and
 (c) an additive component comprising a mixture of materials adapted to provide a source of,
  (1) phosphorus,
  (2) zinc,
  (3) boron, and
  (4) an expansion gas upon thermal decomposition.

16. An article according to the method of claim 1.

17. An article according to the method of claim 8.

18. An article according to the method of claim 15.

* * * * *

UNITED STATES PATENT AND TRADEMARK OFFICE
CERTIFICATE OF CORRECTION

PATENT NO. : 4,696,864
DATED : September 29, 1987
INVENTOR(S) : Thomas A. Ward et al It is certified that error appears in the above-identified patent and that said Letters Patent is hereby corrected as shown below:

Column 4, line 60, claim 8, after "forming" delete "a".

Signed and Sealed this

Eighth Day of March, 1988

Attest:

DONALD J. QUIGG

*Attesting Officer*

*Commissioner of Patents and Trademarks*